United States Patent
Roychoudhury et al.

[11] Patent Number: 5,958,347
[45] Date of Patent: Sep. 28, 1999

[54] PRE-CONVERTER MOUNTING DEVICE

[75] Inventors: Subir Roychoudhury; William C. Pfefferle, both of Madison, Conn.

[73] Assignee: Precision Combustion, Inc., New Haven, Conn.

[21] Appl. No.: 09/061,367

[22] Filed: Apr. 16, 1998

Related U.S. Application Data

[63] Continuation of application No. 08/802,452, Feb. 18, 1997, abandoned.

[51] Int. Cl.$^6$ .................................................. F01N 3/10
[52] U.S. Cl. ........................... 422/179; 422/171; 422/177; 422/180
[58] Field of Search ..................... 422/171, 177, 422/180, 174, 179, 221, 222; 60/299, 300; 29/890

[56] References Cited

U.S. PATENT DOCUMENTS

| | | |
|---|---|---|
| 4,072,471 | 2/1978 | Morgan, Jr. et al. .................. 422/171 |
| 4,407,785 | 10/1983 | Pfefferle ................................. 422/180 |
| 5,051,241 | 9/1991 | Pfefferle ................................. 422/180 |
| 5,190,732 | 3/1993 | Maus et al. ............................. 422/179 |
| 5,250,269 | 10/1993 | Langer .................................... 422/179 |
| 5,413,767 | 5/1995 | Breuer et al. ........................... 422/174 |

*Primary Examiner*—Hien Tran
*Attorney, Agent, or Firm*—Kane,Dalsimer,Sullivan, Kurucz, Levy,Eisele and Richard, LLP

[57] ABSTRACT

Short channel metal catalysts are mounted on the face of conventional monolithic automotive catalysts to assure exhaust gas does not by-pass the short channel metal catalysts.

2 Claims, 1 Drawing Sheet

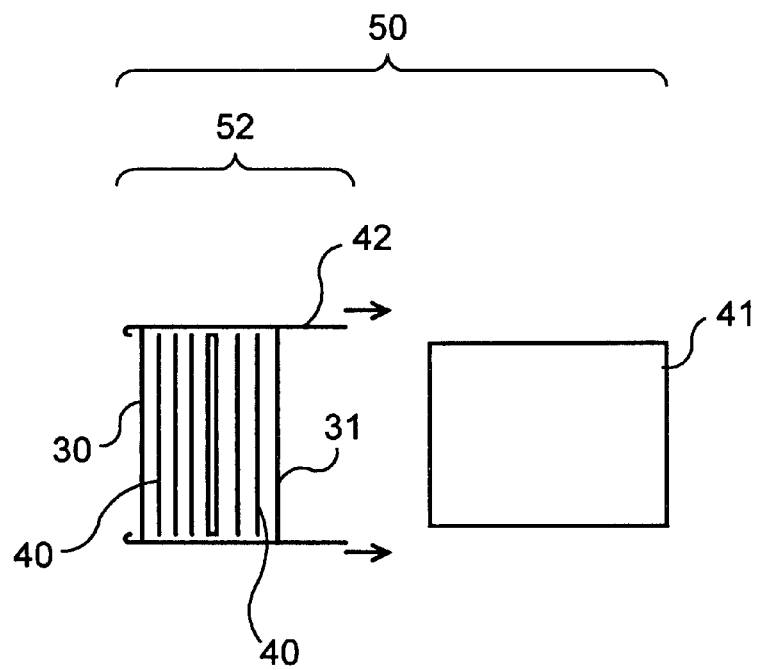
F I G. 1
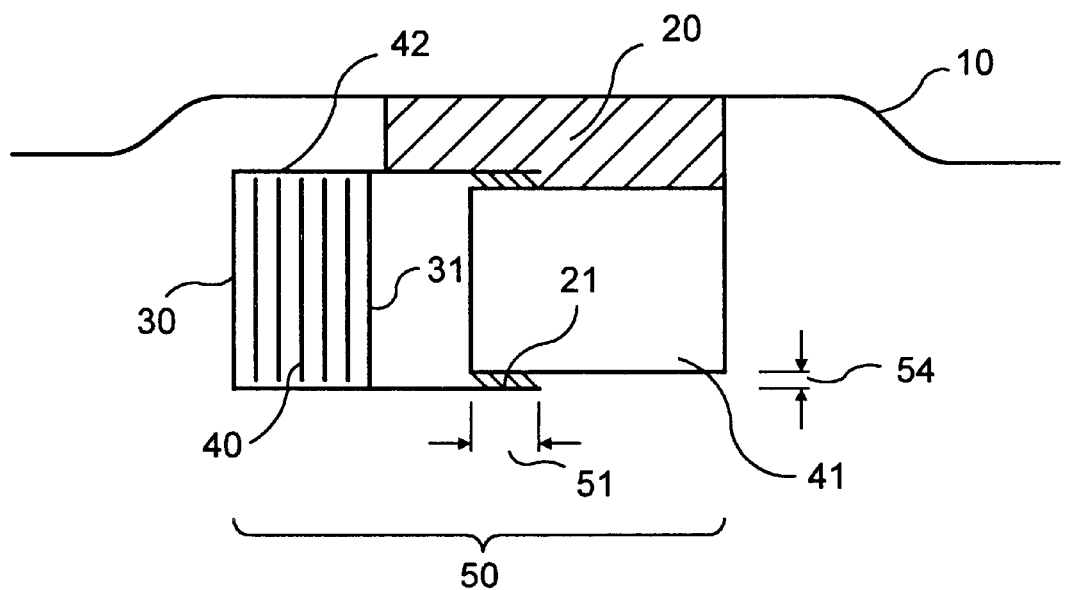
F I G. 2

PRE-CONVERTER MOUNTING DEVICE

CROSS-REFERENCE TO RELATED APPLICATION

This application is a Continuation of U.S. patent application Ser. No. 08/802,452, filed Feb. 18, 1997, now abandoned.

BACKGROUND OF THE INVENTION

1. Field of the Invention

The invention relates to internal combustion exhaust gas catalytic converters and more particularly to a method for allowing the direct coupling of a catalytic pre-converter to a monolithic honeycomb catalyst element.

2. Brief Description of the Related Art

Catalytic converters are the primary means used to control exhaust emissions from internal combustion engines. Catalytic converters, however, experience operational profiles where exhaust emissions control is limited or non-existent. One such operational profile occurs during cold engine start up, where one aspect limiting exhaust emissions control is insufficient heat in the catalytic converter to support catalytic combustion.

Numerous solutions have been proposed to this problem. These solutions can be broadly classed in three categories. The first is simply the more efficient use of the heat generated by the engine, whereby the catalytic converter is located as close as practicable to the engine exhaust manifold to minimize exhaust system heat loss prior to the exhaust gas entering the converter. The second group can be categorized as catalytic pre-heaters. This group is characterized by the use of an external energy source, such as electricity, to pre-heat the catalyst. The third and final group can be categorized as pre-converters. This group is categorized by the use of fast light-off pre-converters that can provide exothermic reactions using the limited existing heat within the exhaust gas.

The successful use of pre-converters depends upon being able to place the pre-converter in close proximity to both the exhaust manifold and the monolithic catalyst. It is critical that the pre-converter be able to exploit the limited heat of combustion coming from the engine as well as transmit most of the heat generated by its exothermic reaction to the monolithic catalyst. As a result of the former criteria, minimum sized catalytic converters with pre-converters have been desired due to the relative premium placed on space up around the engine's exhaust manifold. As a result of the latter criteria, it has been seen as desirable to co-locate the pre-converter and the monolithic catalyst. The greatest degree of co-location is currently accomplished by locating the pre-converter in an upstream piece of tailpipe coupled to the converter.

A short channel metal catalyst unlike other pre-converters allows for the pre-converter to be shaped to conform to the shape of the monolithic catalyst. A short channel metal catalyst, however, like other pre-converters requires an individualized mounting means, a means different than that used to mount the monolithic catalyst. Thus, there is a problem of co-locating a short channel metal catalyst pre-converter and a monolithic catalyst within a converter.

SUMMARY OF THE INVENTION

It has now been found that a short channel metal catalyst capable of covering approximately the entire face of the monolithic catalyst can be mounted directly onto the fragile face of a monolithic catalyst, thus mounting is completely independent from the converter housing. Mounting in this manner simultaneously solves the key issues of isolating the individualized mounting means required for the short channel metal catalyst and the monolithic catalyst, and of sealing of the pre-converter to assure exhaust gas does not by-pass the short channel catalyst, of maximizing the use of the limited exhaust gas thermal energy, and of minimizing the heat loss between the pre-converter and the monolithic catalyst.

The mounting of the short channel metal catalyst directly onto the face of the monolithic catalyst is accomplished by a cantilever means. The cantilever means is composed of a metal sleeve with approximately parallel sides which holds the short channel metal catalyst and has an inside perimeter of similar geometry and an overall length sufficient to account for an overlap of the sleeve over the monolithic catalyst, for any gap required between the short channel metal catalyst and the monolithic catalyst and for the depth of the short channel metal catalyst. The length of the sleeve is between approximately 10 mm to 75 mm. A screen, any screen type material including expanded metal, attached to the face of the sleeve is used to hold the short channel metal catalysts in the sleeve. A second screen could be used between the short channel metal catalysts and the monolithic catalyst if the application required.

The sleeve is slipped over the upstream end of the monolithic catalyst to an overlap of approximately 5 mm to 20 mm. The sleeve is then secured to the monolithic catalyst using an external wrap that grips the exterior of both the sleeve and the monolithic catalyst. In the current invention, an intumescent mat similar to the mat used to secure the monolithic catalyst in the automotive converter could be used. In the present invention the mat used is the mat used to secure the monolithic catalyst. Depending upon the material selected for the sleeve and the monolithic catalyst, a liner material to absorb thermal expansion and contraction differences might be used to minimize wear on the monolithic catalyst resulting from the relative movement between the two pieces. Coupling of the two catalyst elements allows for a catalytic converter with an integral pre-converter without a substantial increase in size above that of the same converter without the pre-converter. In addition, the assembly of the pre-converter and the monolithic catalyst allows for canning of the assembly using existing converter housing techniques.

BRIEF DESCRIPTION OF THE DRAWINGS

FIG. 1 shows a cross-sectional side view of the sleeve with the Microliths installed prior to the sleeve being slid over the monolithic catalyst.

FIG. 2 shows the sleeve slid over the monolithic block and the assembly installed into a typical automotive catalytic converter.

DETAILED DESCRIPTION OF THE INVENTION

As shown in the cross-sectional side view, FIG. 1, the invention 50 is composed of a monolithic catalyst 41 and a sleeve assembly 52. The sleeve assembly 52 is comprised of a sleeve 42, the catalytic elements 40, and screens 30. Screen 31 is optional based on the requirements of the installation. The catalytic elements 40 are microliths a type described in U.S. Pat. No. 5,051,241. The catalytic elements 40 are held in place by two retaining screens 30 and 31, one on either side of the catalytic elements 40. In another configuration wherein the gap between the catalytic elements 40 and monolithic catalyst 41 is small to non-existent only screen 30 would be used. If desired, retaining screens 30 and 31 can have catalytic properties.

Retaining screen 30 is positioned at or near one end of sleeve 42. Catalyst elements 40 are positioned inside sleeve 42 behind retaining screen 30. If used, retaining screen 31 is positioned inside sleeve 42 next to catalyst elements 40.

Screen 30 and 31 can be attached to the sleeve 42 by any means, such as welding. The screens 30 and 31 should be positioned to tightly hold the catalytic elements 40 approximately parallel to the screens 30 and 31. In some applications, the catalytic elements 40 may be angled, not perpendicular, to the sleeve 42.

The screens 30 and 31 are attached to the sleeve 42 such that the catalytic elements 40 will be held firmly in place. The screens 30 and 31 can have any means of attachment to sleeve 42 and the means is not required to be gas tight.

FIG. 2 shows the sleeve assembly 52 slid over the monolithic catalyst 41 with an overlap 51 mounted in an automotive converter 10. The configuration of sleeve 42 is determined based on the application. The sleeve 42 is adapted by size and configuration to slip over the monolithic catalyst 41. The length is a function of the overall length required for the catalytic elements 40, the retaining screens 30 and 31, the desired gap, if any, between retaining screen 31 and monolithic catalyst 41, and the overlap 51 required. The degree of overlap 51 is subject to the design requirements of the application. The overlap 51 is a function of the size and weight of the sleeve assembly 42 and the inherent strength of the monolithic catalyst 41. Sleeve 42 is slide over monolithic catalyst 41 such that screen 31 is adjacent to monolithic catalyst 41. The preferred means for securing sleeve 42 to monolithic catalyst 41 is to use standard automotive monolithic block mounting techniques. A mat material 20 is wrapped around the overlap area 51 with a width sufficient to cover a reasonable portion of monolithic catalyst 41 and sleeve 42. When the automotive housing 10 is then sealed using pressure to bring the two halves of the housing together a compressive force is created in the mat material 20 causing the sleeve 42 to be securely held to the monolithic catalyst 41.

In the gap 54 in the overlap area 51 between the sleeve 42 and the monolithic catalyst 41 a material such as intumescent mat or wire mesh 21 can be inserted. The mat material is used to provide any one of a number of functions such as absorbing expansion differences between sleeve 42 and monolithic catalyst 41 to limit vibration and subsequent damage or provide a better seal.

What we claim is:

1. A catalyst element comprising;

a) a housing having an inlet and an outlet and defining an interior chamber;

b) a monolithic catalyst body having an inlet and an outlet, said catalyst body positioned within the interior chamber;

c) a sleeve with an inlet and an outlet and a cross-sectional profile similar to the cross-section of the monolithic catalyst body, said sleeve being disposed in the interior chamber, and cantilever mounted on the inlet of the monolithic catalyst body, the sleeve outlet overlapping a portion of the monolithic catalyst body adjacent the monolithic catalyst body inlet;

d) a screen mounted on the inlet of the sleeve;

e) a plurality of short channel metal microlith catalysts mounted inside said sleeve between said screen and the monolithic catalyst body;

f) first intumescent mat means overwrapping the monolithic catalyst body and the portion of the sleeve overlapping the monolithic catalyst body; said first intumescent mat means being compressed between the sleeve and the housing; and g) a second intumescent mat means beneath the first intumescent mat means and inserted between the sleeve outlet and the overlapped portion of the monolithic catalyst body.

2. The element of claim 1 which further comprises an additional screen placed in the sleeve between the short channel metal microlith catalysts and the monolithic catalyst body.

* * * * *